INVENTOR.
TANEHIKO OKA

United States Patent Office 3,381,831
Patented May 7, 1968

3,381,831
HYDRAULIC TRANSPORTATION EQUIPMENT FOR SOLUBLE PULVERULENT OR GRANULAR BODIES
Tanehiko Oka, Nagasaki-shi, Japan, assignor to Messrs. Mitsubishi Jukogyo Kabushiki Kaisha, Tokyo, Japan
Filed Nov. 17, 1966, Ser. No. 595,123
2 Claims. (Cl. 214—14)

ABSTRACT OF THE DISCLOSURE

The disclosure is directed to the water-borne transportation, and the loading and unloading from bulk carriers, of water-soluble pulverulent or granular material. A transport ship and a shore-based storage installation are provided with holds and tanks, respectively, for receiving soluble pulverulent or granular material and their saturated solution in the coexisting state. The holds and the tanks are provided with respective eduction means for educing the saturated solution into a pipe system, for transfer between the ship and the shore and vice versa, only during loading and unloading. The circulated saturated solution carries the soluble pulverulent or granular material, in a state of coexistence therewith, to effect loading and unloading of this material.

Background of the invention

As is generally known, soluble pulverulent or granular materials such as sugar, salt, or the like, when handled generally as a freight or a cargo, must be kept from moisture. In other words, a soluble substance in general dissolves in water to form its solution, while in the air it absorbs and releases repeatedly the water of crystallization, in dependence upon the degree of humidity, to solidify into big lumps or plates. This results in troublesome work for loading and unloading as well as a transformed freight or cargo which does not serve the purpose of users. Accordingly water damage of a soluble substance during its transportation leads to a loss in quantity of the freight or cargo and impairs its value to cause serious damage to a consignor, so that the presence of water in the above mentioned substance must be avoided at all costs.

For the above mentioned reasons hydraulic transportation of soluble pulverulent or granular bodies has never been tried, and cargo handling thereof has been effected by means of cranes or pneumatic carriers, but it is also a disadvantage that the soluble pulverulent or granular bodies to be handled absorbs and retains water in the air to solidify. The cargo handling by means of cranes has a further disadvantage in that it requires a large personnel as well as much time, so that a rise in shipping charges is inevitable in spite of speeding-up of the ship.

Summary of the invention

The present invention relates to hydraulic transportation of water-soluble pulverulent or granular material.

A principal object of the invention is to provide a speedy, sure and inexpensive transportation equipment for water-absorbing bulk cargos.

To attain the above object, the hydraulic transportation equipment according to the invention includes a transport ship and a storage installation ashore which are provided respectively with holds and tanks for receiving soluble pulverulent or granular materials and their saturated solution in the coexisting state. The holds and the tanks are provided respectively with eduction means for educing the saturated solution only upon loading and unloading. Between the holds and the tanks there are provided pipe systems for circulating the educed saturated solution. The saturated solution to be circulated carries the soluble pulverulent or granular materials in coexistence therewith to thereby accomplish their loading and unloading.

Brief description of the drawing

An embodiment of the invention will be explained in connection with the accompanying drawing in which.

Figure 1:
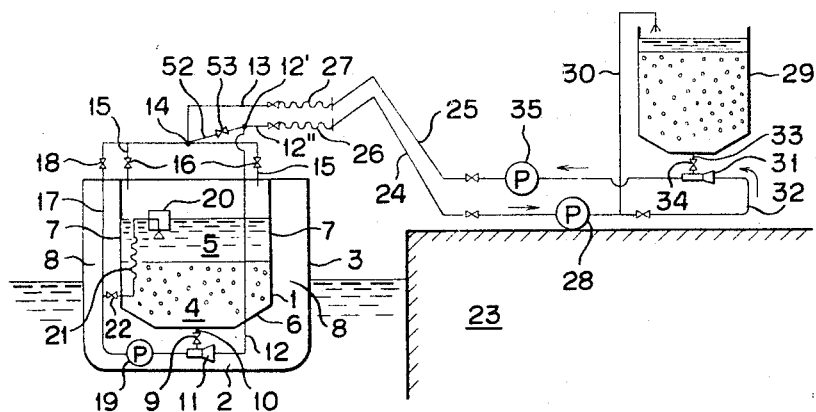
FIG. 1 shows schematically a transportation equipment according to the invention, during loading.

In the drawing 1 denotes a hold for receiving soluble pulverulent or granular material 4 and their saturated solution 5. The hold 1 is provided in the hull 3 of a ship 2, and has a bottom wall 6 which is spaced apart from the hull 3, to form a double wall, and has the shape of an inwardly converging funnel. Between the side walls 7 of the hold 1 and the hull 3 there are formed water tanks 8 for a water ballast.

To the center portion of the bottom wall 6 there is fitted an extraction pipe 10, with a valve 9, which communicates through an ejector 11 with a branch discharge pipe 12, which communicates with a discharge pipe 12', extending in the longitudinal direction of the ship, and a main discharge pipe 12''. 13 denotes a main injection pipe for conveying the saturated solution 5 and the soluble pulverulent or granular material 4 to the ship 2, and 14 denotes an injection pipe which communicates with the main injection pipe 13 and extends in the longitudinal direction of the ship. Branch injection pipes 15 branch off from the injection pipe 14 and open into the hold through respective branch valves 16. The branch injection pipes 15 communicate also with a branch pipe 17 through a valve 18. The branch pipe 17 communicates with the eductor 11 through a pump 19.

20 denotes a floating inlet which floats on the saturated solution 5 so as to aspirate its supernatant liquid only, and 21 denotes an expansible flexible pipe which connects the floating inlet 20 to the branch pipe 17 through a valve 22.

Loading with such device will now be explained in connection with FIG. 1. To begin with, a feed pipe 24 for a carrier medium and a cargo conveying pipe 25, on the shore 23, are connected to the main discharge pipe 12'' and the main injection pipe 13 through flexible pipes 26 and 27, respectively. The valves 9 and 18 remain closed. Then the saturated solution 5 is aspirated by the pump 19 from the floating inlet 20 and conveyed to the feed pipe 24 through the branch discharge pipe 12, the discharge pipe 12', the main discharge pipe 12'' and the flexible pipe 26.

The saturated solution 5 from the feed pipe 24 is further delivered to a branch pipe 30 which opens into the top of a hopper 29, for receiving the soluble pulverulent or granular materials, and another branch pipe 32 which leads to an ejector 31 provided beneath the hopper 29.

When an outlet valve 34, in an outlet pipe 33 which is fitted to the bottom of the hopper 29, is opened, the soluble pulverulent or granular materials in the hopper 29 are mixed with the saturated solution which is supplied from the branch pipe 30, then educed by the ejector 30 from the hopper 29, and conveyed by the pump 35 to the cargo conveying pipe 25 together with the saturated solution in the branch pipe 32.

The pulverulent or granular materials together with their saturated solution in the cargo conveying pipe 25 are fed to the hold 1 through the flexible pipe 27, the main injection pipe 13, the injection pipe 14 and the branch injection pipes 15. In this case, the soluble pulverulent materials 4 settle to the bottom of the hold 1, while the saturated solution 5 above the settled bodies is aspirated into the floating inlet 20 and circulated again as a carrier medium. After completion of loading, the soluble pulverulent or granular materials, in coexistence with the saturated solution, are transported by the ship to an unloading place.

Figure 2:
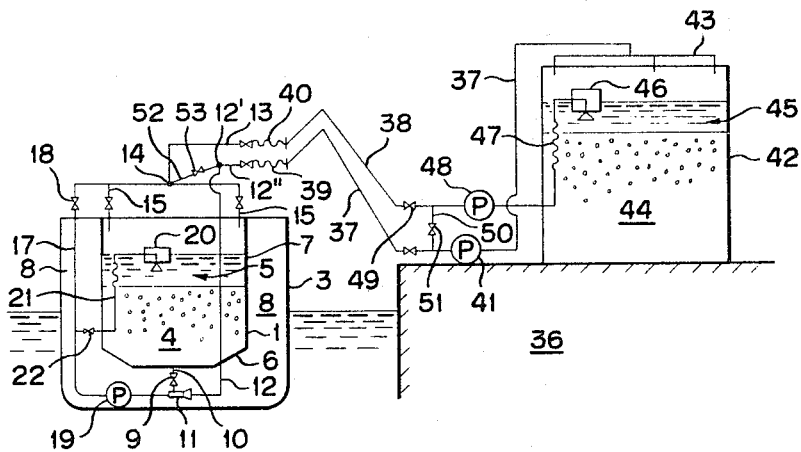
FIG. 2 shows schematically the transportation equipment, during unloading.

Unloading will next be explained in connection with FIG. 2. An unloading pipe 37 and a feed pipe 38 for a carrier medium are connected to the main discharge pipe 12" and the main injection pipe 13 of the ship 2 through flexible pipes 39 and 40 respectively. The valve 22 is now closed, while the valves 9 and 18 are opened. Then the soluble pulverulent or granular materials 4 and their saturated solution 5 in the hold 1 are educed by the ejector 11 and unloaded by a pump 41 into a tank 42 on the shore through the branch discharge pipe 12, the discharge pipe 12', the main discharge pipe 12", the flexible pipe 39, the unloading pipe 37 and branch unloading pipes 43 which open into the corners at the top of the tank 42. In this case, as in the loading, the unloaded pulverulent or granular materials 4 settle to the bottom of the tank 42 while the saturated solution 45 above the settled materials is aspirated into a floating inlet 46 and delivered through a flexible pipe 47 to a pump 48 which conveys the solution to the feed pipe 38.

The saturated solution in the feed pipe 38 is then injected into the hold 1 through the flexible pipe 40, the main injection pipe 13, the injection pipe 14 and the branch injection pipes 15, and at the same time fed to the branch pipe 17. The solution in the branch pipe 17 is fed by the pump 19 to the ejector 11, and led to the tank 42 on the shore together with the pulverulent or granular materials and the saturated solution which are educed from the hold 1.

In case that eduction by the ejector 11 should be impaired owing to the bridging effect, it is preferable that valve 49 in the feed pipe 38 is closed while a valve 51, in a communicating pipe 50 for connecting the feed pipe 38 with the unloading pipe 37, is opened whereby the saturated solution which is aspirated by the pump 48 from the tank 42 flows backward through the communicating pipe 50, the unloading pipe 37, the flexible pipe 39 and the discharge pipe 12 so as to agitate the cargo in the hold 1. In case of the flexible pipe 21 being clogged upon loading, it is preferable to flow the saturated solution backward in the same manner.

Further in case of an accident in one of the holds, transfer of the cargo to another hold will be possible by opening the valve 53, in the communicating pipe 52 which connects the discharge pipe 12' with the injection pipe 14.

For a high efficiency in transportation, it is desirable to determine the quantity of the saturated solution in the hold so that the level of the solution is slightly above the surface of the bodies. In the case of salt, its solid part is preferably about 72% of total weight (about 57% in volume), although this value varies according to its producer. The remainder of 28% is the saturated solution, in which 5% salt of the total weight is contained so that 77% salt can be transported in accordance with the invention.

The economical mixture ratio of the soluble pulverulent or granular bodies to their saturated solution in cargo work varies in accordance with the distance between the ship and a cargo base ashore, and the preferable ratio of the soluble pulverulent or granular bodies is in general 20–40% in volume. (This value, which varies according to the diameter as well as the specific gravity of particles, the specific gravity and the viscosity of the solution, and the like, is, of course, an approximate value.)

If hatches are provided on the deck, it will be possible to take cargoes in the ship by the usual loading means such as cranes, conveyers, chutes and the like at a raw material supplying base. In this case, a carrier medium such as water must be provided in the ship.

For raw sugar, a clean water injection equipment may be provided while for salt a sea water injection equipment may be provided. In order to answer the main purpose of the invention, however, it is more desirable to load the pulverulent or granular bodies, together with their solution, by pump and pipe systems at a raw material supplying place.

In case of salt, saturated salt water is easy to obtain, because the saturated salt water is produced and then evaporated so as to produce solid salt in the salt manufacturing process. Further work for extraction of water at a loading place can be saved. Similarly, in the case of raw sugar, its saturated solution is easy to obtain because it is concentrated in the sugar refining.

As mentioned above, no special equipment is required, and the purpose of the invention is easily attained solely by provision of a tank having a certain capacity.

In industrial utilization of soluble pulverulent or granular materials it is a common practice to use the same in the form of their solution. In case of industrial salt, for example, it is utilized in different manners, such as ammonia process, electrolytic process and the like, and all of these processes require saturated salt water. According to the invention, the supernatant saturated salt water can be educed for utilization, and this results in omission of the step of dissolving solid salt. Dilute salt water after the chemical reaction is returned to a raw material storage tank in which solid raw material is dissolved in it, and circulated for use again as the saturated solution.

As described in detail above, the feature of the present invention consist in the combination of holds and tanks for receiving soluble pulverulent or granular materials and their saturated solutions in the coexisting state, and provided, respectively, in a transport ship and in a storage installation ashore for the soluble pulverulent of granular materials, eduction means for educting the saturated solution only upon loading and unloading provided, respectively, in the holds and the tanks, and pipe systems for circulating the educed saturated solution provided between the holds and the tanks, the saturated solution to be circulated carrying the soluble pulverulent or granular materials, in coexistence therewith to thereby accomplish their loading and unloading.

According to the invention, as the soluble pulverulent or granular materials are transported, loaded and unloaded in coexisting state with their saturated solution, they never absorb water to change their shape so that hydraulic transportation of the soluble pulverulent or granular materials, which has been regarded as impossible, is made possible and this results in a saving of time and expenditure for cargo work.

Further, up to now, cargo working of such materials, owing to their solubility, has been interrupted in rainy weather. The invention, however, makes it possible regardless of weather.

The saturated solution, as a carrier medium remaining in the ship, is available for a base load so that the time for taking a water ballast can be saved.

In the case of transportation of salt, magnesium chloride which is contained in the salt dissolves into the circulating saturated salt water, in accordance with its solubility, during transportation, for the reason that the solubility of magnesium chloride is larger than that of sodium chloride, and this makes removal of magnesium chloride easy. The circulating solution rich in magnesium chloride also may be used as a raw liquid for production of magnesium chloride.

While the invention has been described in connection with the transportation of salt and sugar, it is not limited to the transportation of salt and sugar, but generally to that of a soluble matter.

A suitable solvent other than water can also be used. above all the present invention not only makes cargo work smooth, sure and speedy but also makes construction expenses for cargo work installations small, and it is very useful for industrial purposes.

What is claimed is:

1. A hydraulic conveying arrangement for soluble pulverulent or granular material comprising, in combination, a water-borne cargo carrier having a hull and at least one hold within said hull and having a bottom wall spaced above the hull bottom, said hold receiving and transporting soluble pulverulent and granular materials together with completely saturated solutions thereof, with said materials resting on the hold bottom and the saturated solutions forming a supernatant fluid body above the materials; a first ejector disposed beneath the bottom wall of said hold; a first valved outlet in the hold bottom wall connected to said first ejector to discharge material thereinto; a first fluid intake within said fluid body; a first discharge pipe connected to the outlet of said ejector; a short-based material supply tank containing pulverlent or granular material to be loaded into said hold; a second ejector disposed beneath the bottom wall of said supply tank to receive material from the latter; a first feed pipe connected to the outlet of said second ejector and discharging into said hold; a second valved outlet in the supply tank bottom wall connected to said second ejector; pump means connecting said intake to the inlet of said first injector and said discharge pipe to the inlet of said second injector to withdraw material from said supply tank and discharge material in saturated solution into said hold to load said hold; whereby, when said first valve outlet is closed and said second valved outlet is opened, with said pump means operating, saturated solution is withdrawn from said fluid body and circulated unidirectionally through said first ejector; said first discharge pipe, said second ejector, and said first feed pipe to discharge material from said supply tank into said hold; a shore-base material storage tank to receive pulverulent and granular material from said hold with said material resting on the bottom of said storage tank and the saturated solution forming a supernatant fluid body above the material therein; a second fluid intake within the fluid body in said storage tank; second pump means connecting said second fluid intake to said first feed pipe; and a second feed pipe connected to the outlet of said first pump means and discharging into said storage tank above the fluid body in the latter; whereby, with said first valved outlet open and said valved means open, with said first and second pump means operative, fluid is withdrawn from said second intake and delivered through said second pump means and said first feed lines to said valved means and to the inlet of said first ejector and from there through said discharge pipe and said first pump means to said second feed pipe to withdraw material from said hold and deliver material to said storage tank.

2. A hydraulic conveying arrangement, as claimed in claim 1, comprising flow control means, included in the pipe systems comprised by said feed and discharge pipes, and selectively operable to reverse the flow through the pipe systems, during loading and unloading operations, to agitate the materials to break up bridging thereof in the tanks and the holds, respectively.

References Cited

UNITED STATES PATENTS

| | | | |
|---|---|---|---|
| 815,272 | 3/1906 | Devereux | 137—578 X |
| 1,091,251 | 3/1914 | Stauffer | 302—14 X |
| 1,195,391 | 8/1916 | Newman | 137—578 X |
| 1,337,279 | 4/1920 | Sensibar | 214—15 |
| 1,528,003 | 3/1925 | Yarnall | 137—578 |
| 1,564,805 | 12/1925 | West | 214—15 X |
| 2,702,786 | 2/1955 | Hakes | 137—578 X |
| 2,920,635 | 1/1960 | Wilson | 302—15 X |
| 3,305,106 | 2/1961 | Ishino | 302—14 X |

EVON C. BLUNK, *Primary Examiner.*

ANDRES H. NIELSEN, *Examiner.*

M. L. AJEMAN, *Assistant Examiner.*